United States Patent
Claps et al.

(10) Patent No.: US 9,601,028 B2
(45) Date of Patent: Mar. 21, 2017

(54) MUSICAL INSTRUMENT TRAINING DEVICE AND METHOD

(71) Applicants: Paul G. Claps, Algonquin, IL (US); Jeffrey C. Petrin, Algonquin, IL (US); Mariusz Smialek, Bartlett, IL (US)

(72) Inventors: Paul G. Claps, Algonquin, IL (US); Jeffrey C. Petrin, Algonquin, IL (US); Mariusz Smialek, Bartlett, IL (US)

(*) Notice: Subject to any disclaimer, the term of this patent is extended or adjusted under 35 U.S.C. 154(b) by 230 days.

(21) Appl. No.: 14/482,141

(22) Filed: Sep. 10, 2014

(65) Prior Publication Data

US 2016/0071430 A1    Mar. 10, 2016

(51) Int. Cl.
G10G 1/02 (2006.01)
G09B 15/06 (2006.01)
G09B 15/02 (2006.01)

(52) U.S. Cl.
CPC .................. G09B 15/023 (2013.01)

(58) Field of Classification Search
USPC ...................................... 84/485 R
See application file for complete search history.

(56) References Cited

U.S. PATENT DOCUMENTS

| | | | | |
|---|---|---|---|---|
| 4,901,618 A * | 2/1990 | Blum, Jr. | ............... | G10G 1/02 84/453 |
| 6,162,981 A * | 12/2000 | Newcomer | ............ | G09B 15/04 84/470 R |
| 7,173,175 B2 * | 2/2007 | Shaffer | ............... | G09B 15/003 84/314 R |
| 7,427,704 B2 * | 9/2008 | Huwaldt | ............... | G10G 1/02 84/314 R |
| 8,173,887 B2 * | 5/2012 | Sullivan | ............... | G10H 1/342 84/724 |

* cited by examiner

*Primary Examiner* — Christopher Uhlir
(74) *Attorney, Agent, or Firm* — Mathew R. P. Perrone, Jr.; Joseph Whang

(57) ABSTRACT

A musical instrument training device has a sensor array cooperating with a remote device and an electronic controller to assist as a guide for finger placement on the strings of the instrument, and to provide feedback on proper finger use and placement, the sensor being removably mountable on an instrument neck.

9 Claims, 11 Drawing Sheets

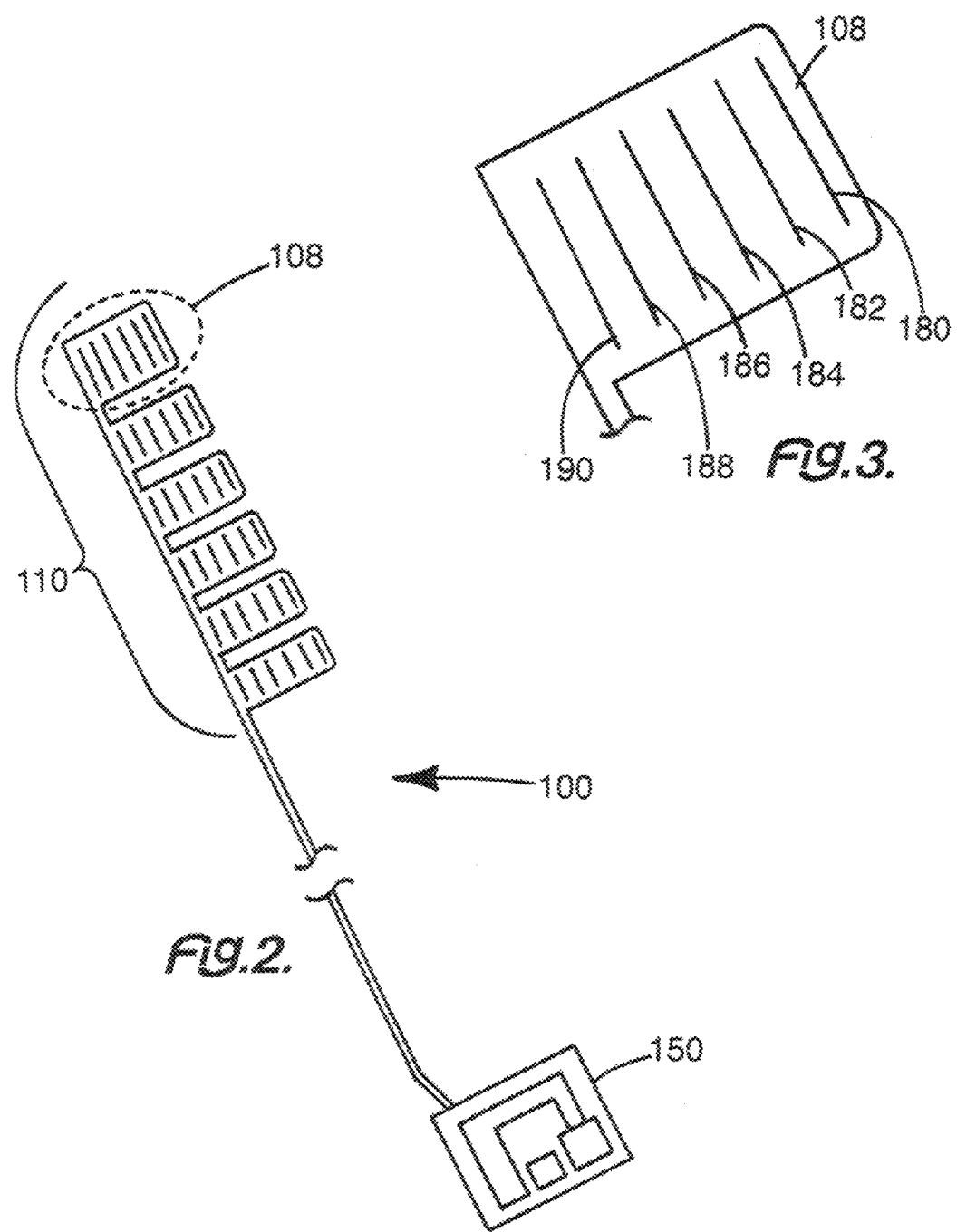

MUSICAL INSTRUMENT TRAINING DEVICE AND METHOD

This invention relates to a music teaching device and more particularly to a device and method in the technical field of music instruction for music teaching or music training, especially as it relates to stringed instruments and training to play the same.

BACKGROUND OF THE INVENTION

Conventional musical training devices require fully operational musical instruments or specialized versions of those instruments that use a wired connection to a training computer. On these training devices, prompting of the user is limited to notes scrolling across a score sheet or relying on the understanding of the user or memory of the note or songs to be played. Then the music student can play the notes.

For a stringed instrument, finger placement for the student or user of the instrument is critically important. Typically, the presence of a skilled instructor is required to promote proper finger placement. While many devices exist to help a musician or user of an instrument learn how to play a stringed instrument; such as a guitar, no such device exists with the capability of showing the student proper finger placement.

Also critical in the playing of a stringed instrument is a properly tuned instrument. Such tuning must be done skillfully and accurately. It is difficult for a student to have the skill in tuning an instrument. If the tuning skills of the novice can be enhanced by a device, great advantages are obtained.

Proper feedback during the playing of the instrument also requires the presence of skilled instructor in most cases. If a device can provide audio or visual feedback, without an instructor present, it becomes quite feasible for the student musician to practice more efficiently when practicing alone.

However, this structure does not include an audio prompt audible only to the user with the proper note, tone, pitch, or duration played for the user to aid in a "musical ear" development for the user. Also, conventional devices require the instrument to be played, thus producing an audible output that can disturb other people in the surrounding area.

Other conventional training devices are wired, standalone devices that do not provide feedback to the user that the actions of the user are correct. Also on the conventional devices, there is no provision for monitoring or tracking the actions of the user over time to gauge progress in gaining speed or accuracy in the placement of fingers on the strings. There is also no means to convert finger placements to a score.

Still other conventional devices that are intended to instruct musicians or that can convert the sound of notes played to a score require an environment where the sound can be played on a full and complete instrument with or without an audio amplifier at an audible level thereby disturbing the environment of the user. Thus, these devices are not usable on a bus, a plane, a park or other public venue. In addition, many of these other instructional devices are not mobile or user configurable. Still another shortcoming on other conventional training devices is that the string tension cannot be adjusted to the user preference.

SUMMARY OF THE INVENTION

Among the many objectives of this invention is to provide a musical instrument training device for training a musician to develop a musical ear for the proper sound of notes.

A further objective of this invention is the provision of a musical instrument training device for training a musician to be heard only by the musician.

Yet a further objective of this invention is the provision of a musical instrument training device for training a musician to promote proper finger placement.

A still further objective of this invention is the provision of a musical instrument training device for training a musician, which provides audio feedback to the user.

Another objective of this invention is the provision of a musical instrument training device for training a musician, which provides video feedback to the user.

Yet another objective of this invention is the provision of a musical instrument training device for training a musician, which adjusts feedback to the user.

These and other objectives of the invention (which other objectives become clear by consideration of the specification, claims and drawings as a whole) are met by providing a musical instrument training device having a sensor array cooperating with a remote device and an electronic controller to assist in finger placement on the strings of the instrument, and to provide feedback on proper finger use and placement, the sensor being removably mountable on an instrument neck.

BRIEF DESCRIPTION OF THE DRAWINGS

FIG. 2 depicts a top plan view of the sensor assembly 100 and the electronic controller 150 for the portable training device 112, as shown in FIG. 1, for the present invention.

FIG. 3 depicts an enlarged view of one of the singular fret sensor arrays 108 of the plurality of fret sensor arrays 110 for the sensor assembly 100 of the portable training device 112, as shown in FIG. 1, for the present invention.

Throughout the figures of the drawings, where the same part appears in more than one figure of the drawings, the same number is applied thereto.

DESCRIPTION OF THE PREFERRED EMBODIMENTS

Figure 1:
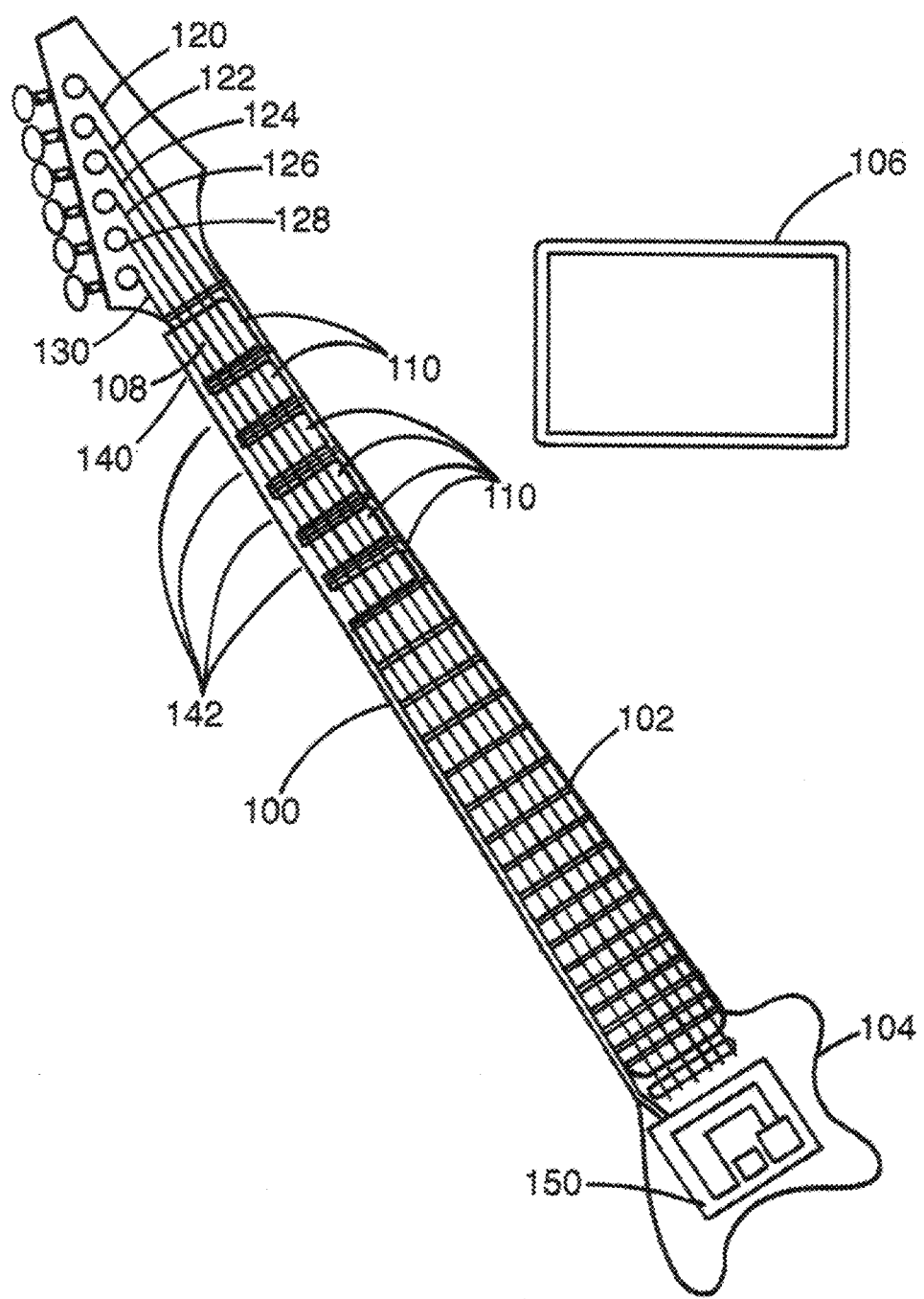
FIG. 1 depicts a top plan view of the portable training device 112 and the remote device 106 for the present invention.
Figure 4:
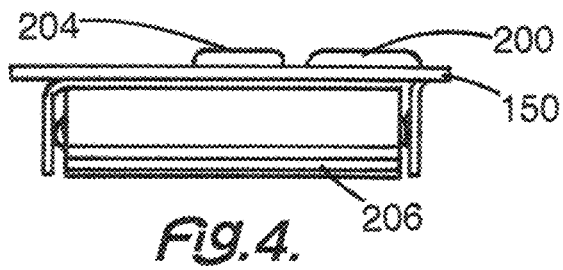
FIG. 4 depicts a side view of the electronic controller 150 for the portable training device 112, as shown in FIG. 1, for the present invention.
Figure 5:
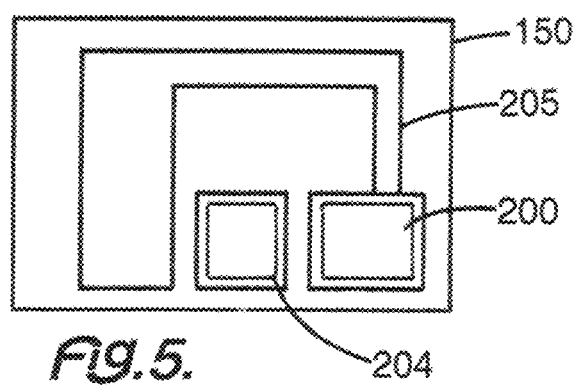
FIG. 5 depicts a top plane view of the electronic controller 150 for the portable training device 112, as shown in FIG. 1, for the present invention.
Figure 6:
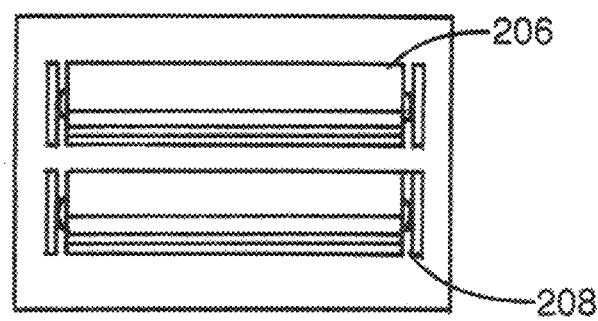
FIG. 6 depicts a bottom plan view of the electronic controller 150 for the portable training device 112 of the present invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

The present invention relates to music teaching device or a music training device for teaching a musician or user of an instrument. Unless otherwise defined, instrument user, user, musician or may be used interchangeably for the purpose of this application. All of those terms refer to a person using the musical instrument training device and method of this invention.

This music teaching device or a music training device is a portable training device for teaching a person to play a stringed instrument. Such a portable training device provides the ability to direct the actions of student by means of audio or visual prompts, to monitor the user's actions, or to provide the user audio or visual feedback of their actions on the training device from a remote unit or a remote device, remote unit and remote device being substantially interchangeable.

The present invention also has the ability to transpose the actions of a musician or user of the instrument into a music score on the remote unit or remote device. The present invention further has the ability to provide the sounds of the notes played solely to the user or to a larger audience. Typical stringed instruments on which this device may be used include, but are not limited to, a guitar, a banjo, a violin, a viola, a cello, and a bass fiddle.

Referring now to the invention in more detail, in FIG. 1 there is shown a top view of the portable training device 112 with the sensor assembly 100, the electronics enclosure 104, the electronic controller 150 and an instrument neck 102 arbitrarily chosen and the remote device 106 arbitrarily chosen as a typical embodiment of the invention. The sensor assembly 100 consists of a singular fret sensor array 108 or a plurality of fret sensor arrays 110. Sensor assembly 100 attaches to an instrument neck 102 underneath all of the strings on the instrument; such as the first string 120, the second string 122, the third string 124, the fourth string 126, the fifth string 128, the sixth string 130, or less or more strings. The set of strings can apply to a singular fret position 140 or singular fret sensor array 108, or plurality of fret positions 142 or plurality of fret sensor arrays 110.

The instrument neck 102 attaches to the electronics enclosure 104 that contains the electronic controller 150 in FIG. 2, FIG. 4, FIG. 5, and FIG. 6 and also serves as balance and a body rest for the portable training device 112. FIG. 3 especially shows a singular fret sensor array 108 with the first string sensor 180, the second string sensor 182, the third string sensor 184, the fourth string sensor 186, the fifth string sensor 188 and the sixth string sensor 190.

Figure 8A:
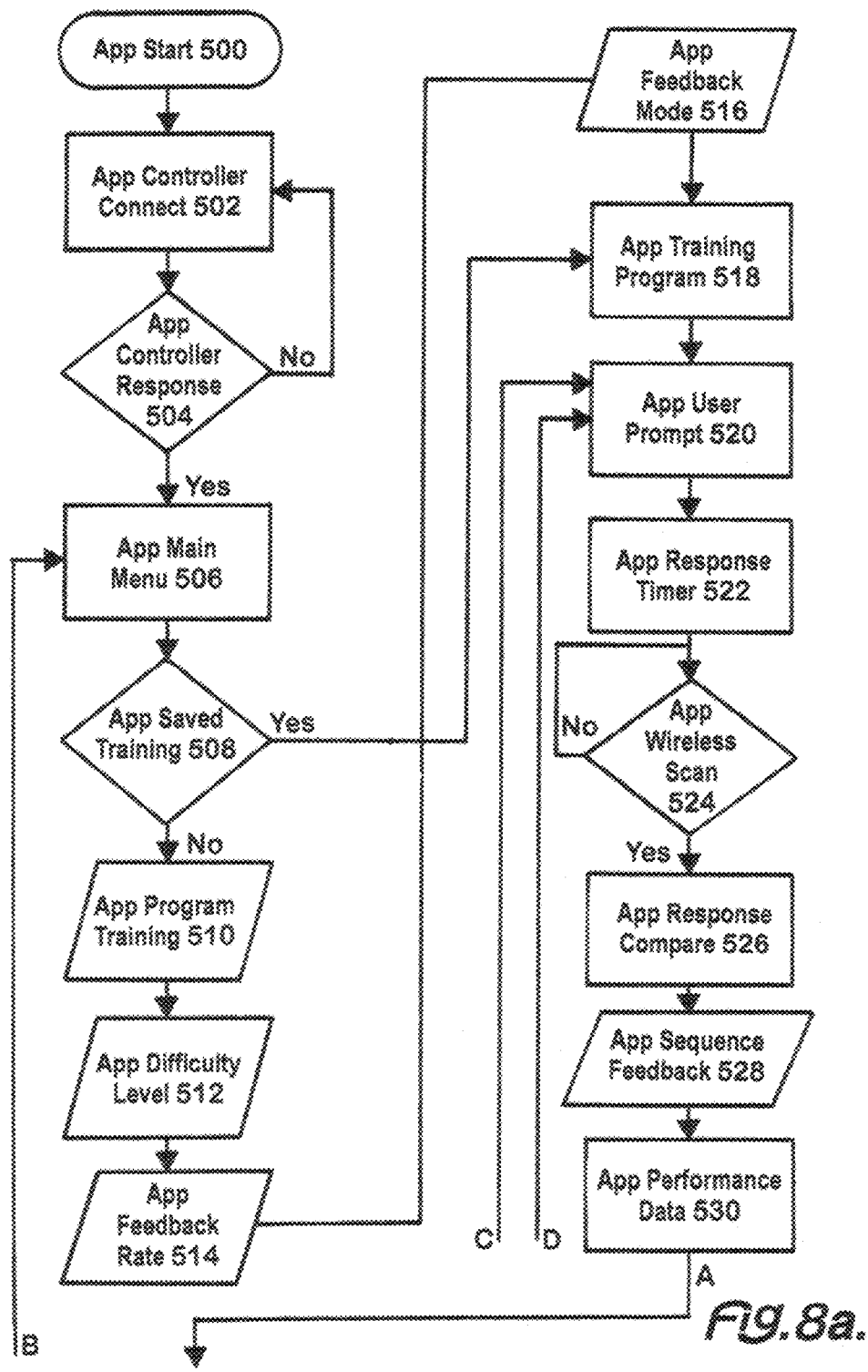
FIG. 8 is formed by a combination of FIG. 8a and FIG. 8b to depict a simplified flow chart for the operation of the user app as functioning in the remote device 106.
Figure 8B:
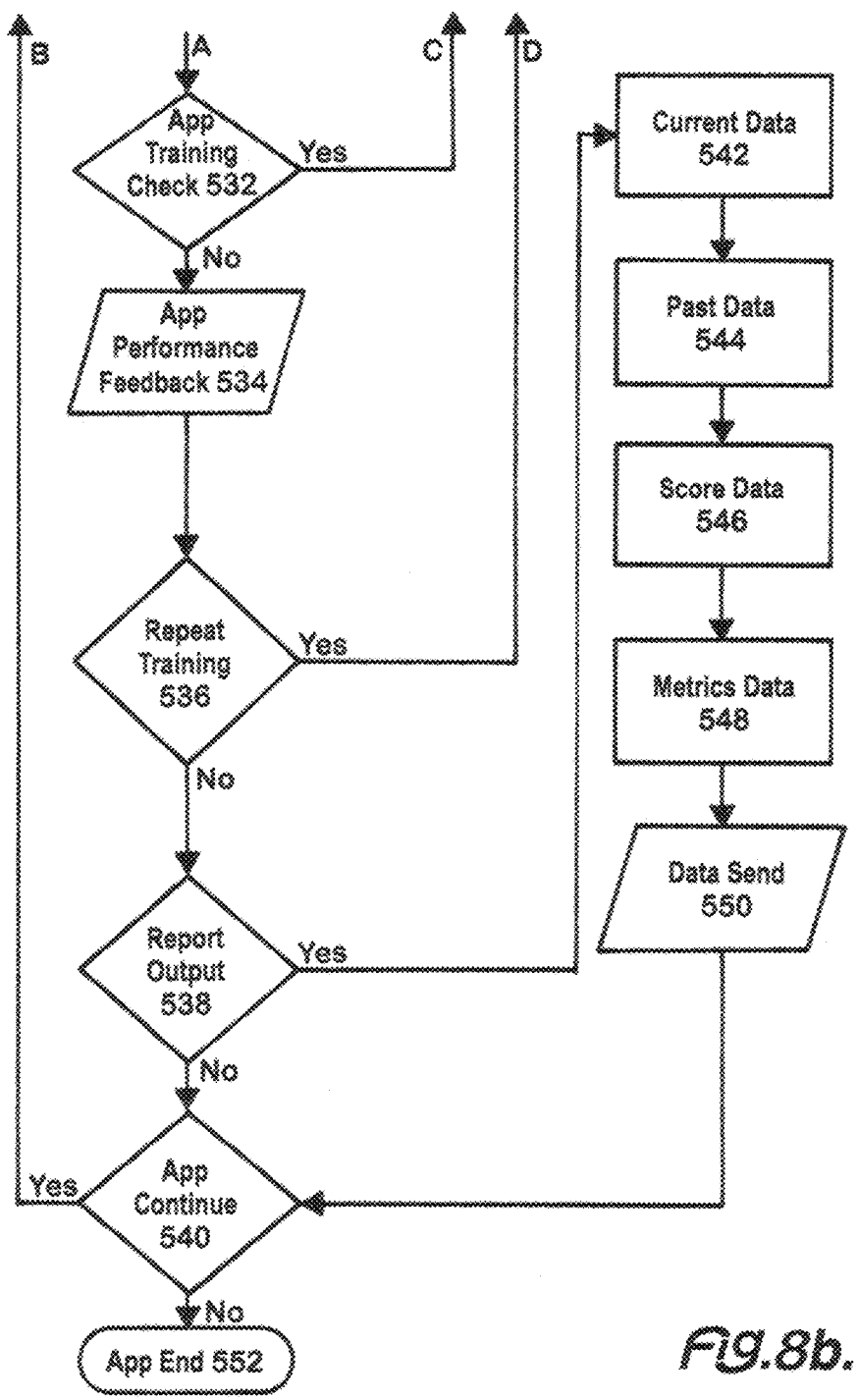

In a typical application, the remote device 106 executes a user application described by the user app flow chart in FIG. 8; formed by FIG. 8a and FIG. 8b; to direct, monitor, track, and record the finger actions of the instrument user on the first string 120, the second string 122, the third string 124, the fourth string 126, the fifth string 128 and the sixth string 130. The remote device 106 is a generic representation of a commonly available and widely used portable wireless electronic device such as a cellular phone, a tablet, or other personal wireless device capable of a wireless connection. A typical example of a wireless device, including but not limited to, is available under United States Registered Trademark BLUETOOTH. BLUETOOTH is a Registered Trademark of Bluetooth Sig, Inc, a Delaware Corporation, of 500 108$^{th}$ Avenue NE, Suite 250, Bellevue, Wash. 98004. In its application remote device 106 prompts the instrument user with either visual or audio cues of notes, sets of notes, or songs for which the instrument user is to perform the corresponding finger placements.

The electronic controller 150 monitors the first string sensor 180, the second string sensor 182, the third string sensor 184, the fourth string sensor 186, the fifth string sensor 188, and the sixth string sensor 190 on the singular fret sensor array 108 or plurality of fret sensor arrays 110 for finger placements and communicates this information by either a wired or wireless connection to the remote device 106. Remote device 106 records, tracks, and analyzes the singular fret sensor array 108 or the plurality of fret sensor arrays 110 activations with respect to the prompted note, sets of notes, or songs prompted. Remote device 106 then presents the live or recorded information to the user so that the information can be reviewed, saved, or otherwise evaluated by the user or another person.

In more detail, the user initiates the operation of the invention by launching the application on the remote device 106 as described by the user app flow chart in FIG. 8. In the preferred embodiment the user launches the training app on remote device 106 which initiates a wireless connection to the microprocessor 200 on the electronic controller 150 by sending a command to the wireless controller in the microprocessor 200 through the antenna 218 on electronic controller 150 to connect with remote device 106. The electronic controller 150, which is powered by the voltage regulator 204 via the first battery 206 and second battery 208 periodically wakes from low power mode as described in the controller flow chart in FIG. 9 to scan for a remote connection request from the remote device 106. When the electronic controller 150 receives the connection request it establishes a link with the remote device 106.

After the link between the remote device 106 and the electronic controller 150 is established, the application on the remote device 106 prompts the user for the operation settings as described by the user app flow chart in FIG. 8 including but not limited to the training program to be executed, the difficulty level of the training program, the user feedback rate, and the user feedback method. The training program can consist of musical notes including but not limited to C, D, E, F, G, A, B individually or sets of notes in varying sequences, or songs. The training program can also consist of user defined or other sequences of notes. The difficulty level of the training program can be but is not limited to the interval between notes and the sequence of notes. The feedback rate includes but is not limited to immediate feedback for each note, feedback for each group of notes, or feedback for each training program.

The feedback method can be singular or multiple methods including but not limited to visual indication on the remote device 106, audible indication from remote device 106, or audible indication from remote device 106 by means of another speaker, headphone, or other such audio device. The feedback can also be recorded for playback or comparison to the training program selected in the form of a score, table, or other means at a later time.

After the user selects the operation settings, remote device 106 prompts the user to play a musical note or notes in the training program selected. The electronic controller 150 monitors the singularity 108 or plurality of fret sensor arrays 110 on the instrument neck 102 to sense when and where each of the first string 120, the second string 122, the third string 124, the fourth string 126, the fifth string 128 or the sixth string 130 have been pressed by the user. For each note prompted by the remote device 106 and played by the user, the electronic controller 150 sends the first string 120, the second string 122, the third string 124, the fourth string 126, the fifth string 128 or the sixth string 130 presses and fret locations detected by the fret sensor arrays 110 to the remote device 106.

The remote device 106 monitors, compares, and tracks the first string 120, the second string 122, the third string 124, the fourth string 126, the fifth string 128 or the sixth string 130 presses and fret locations and timing of string presses to compare this information to the notes in the training program executed by the remote device 106. Remote device 106 then provides the user feedback in the manner selected in the operation settings at the beginning of the application execution.

More specifically FIGS. 8a and 8b describe one embodiment of the invention's general operation of the user app. To begin remote device 106 enters App start 500 when the user launches the app. After app start 500 remote device 106 initiates a wireless connection to electronic controller 150 in the app controller connect 502 stage and waits for a connection in app controller response 504. If app controller response 504 does not receive a connection response from electronic controller 150 remote device 106 reverts to app controller connect 502 and attempts another connection. If app controller response 504 detects a connection, remote device 106 displays the app main menu 506 to the user.

On the app main menu 506 the user has the choice of creating a new or using a saved training program. If the user selects to use app saved training 508 remote device 106 enters app training program 518. If the user does not select a saved training file remote device 106 prompts the user for app program training 510 data that includes the user selecting notes, sets of notes, or songs to be included in the training file. Next, the remote device 106 prompts the user for the app difficulty level 512, the app feedback rate 514, and the app feedback mode 516 which are saved as a file for app training program 518.

Following the setup of app training program 518 remote device 106 initiates app user prompt 520 to provide the user with the audio or visual cue of the note, set of notes, or song to be played in the training exercise. Subsequent to the app user prompt 520 remote device 106 starts app response timer 522 to measure the amount of time the user takes to respond to the app user prompt 520 through app wireless scan 524. If remote device 106 does receive a response it continues app wireless scan 524. Once remote device 106 app wireless scan 524 receives a response from electronic controller 150 via send comm packet 444 in FIG. 9 remote device 106 stops the timer and evaluates the time in app response compare 526 to the predetermined time associated with the selected difficulty level in app training program 518. App response compare 526 further evaluates the plurality of fret sensor arrays 110 data from send comm packet 444 in FIG. 9 for accuracy compared to the sequence of the app training program 518.

After completing the evaluation remote device 106 provides app sequence feedback 528 via the audio or visual feedback selected in app training program 518 and saves the user response accuracy in app performance data 530 for future query or analysis. If app training check 532 determines that app training program 518 has more exercises remaining electronic controller 106 reverts to app user prompt 520 for the next training sequence. If app training check 532 determines app training program 518 is complete remote device 106 provides app performance feedback 534 to the user for the entire app training program 518.

Subsequently remote device 106 prompts the user to select repeat training 536 reverting to app user prompt 520 if the user response is yes. Alternatively remote device 106 prompts the user to select report output 538. If the user selects yes electronic controller 106 successively prepares current data 542 for the current training session, past data 544 for the history of training sessions, score data 546 for the notes played in training, and metrics data 548 of trend of overall timing, accuracy, and difficulty of training recorded. Next remote device 106 prepares and performs data send 550 to communicate the output data 542, 544, 546, or 548 to a file, wireless connection point, or other destination defined by the user.

Following data send 500 or the user selecting no report output 538 remote controller 106 prompts enters app continue 540 to prompt the user to determine to continue training or end the app. If the user selects to continue training remote device 106 returns to app main menu 506 for more user training. If the user selects to end the training app end 552 terminates the application on remote device 106.

Figure 9:
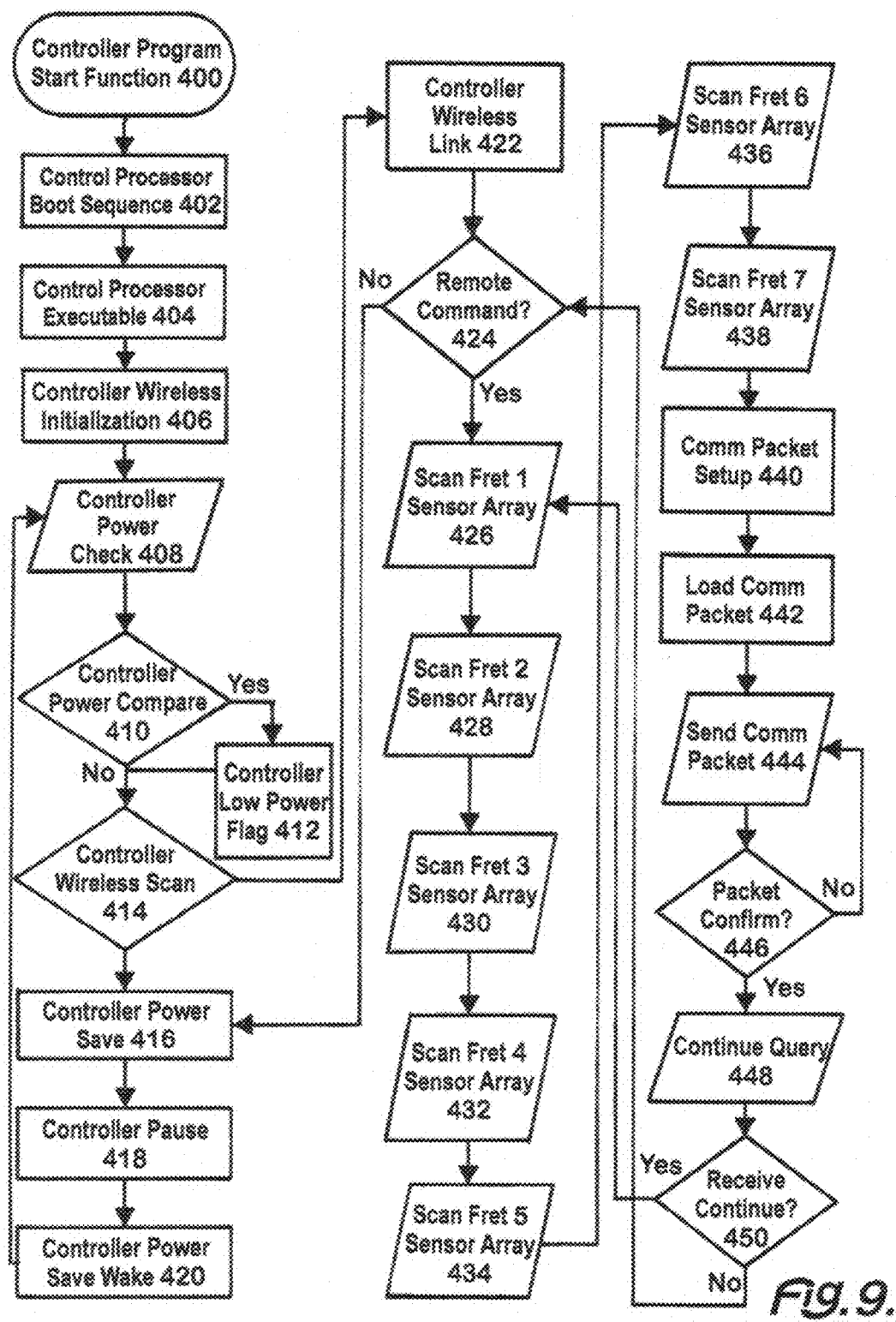
FIG. 9 combine to depicts a simplified flow chart for the operation of the electronic controller 150.

FIG. 9 more particularly describes one embodiment of the invention as it details the general operation of the executable program in Microprocessor 200 on electronic controller 150. To begin microprocessor 200 enters controller program start function 400 of the application code when first battery 206 and second battery 208 are installed. After this microprocessor 200 performs controller processor boot sequence 402 to setup microprocessor 200 for operation and then loads controller processor executable program 404 prior to performing the controller wireless initialization 406.

After initializing and setting up microprocessor 200 to operation, the system performs controller power check 408 to determine the voltage present in first battery 206 and second battery 208 and passes the value controller power compare 410 and adjusts controller low power flag 412 if the voltage reading is below a predetermined value before proceeding to Controller wireless scan 414 or goes directly to Controller wireless scan 414 if the voltage is above the predetermined value.

If controller wireless scan 414 does not detect a request to pair with remote controller 106, electronic controller 150 enters controller power save 416 to conserve power in batteries 206 and 208 for a predetermined time in controller pause 418. After the controller pause 418, electronic controller 150 initiates controller power save wake 420 and performs controller power check 408 again and repeats the sequence described in perpetuity until the power in batteries 206 and 208 is exhausted or Controller wireless scan 414 detects a pairing request from remote controller 106.

Once Controller wireless scan 414 detects a pairing request from remote controller 106, Controller wireless link 422 establishes the connection with the remote controller 106 and waits in remote command 424. If no command from remote controller 106 is received in a predetermined time, microprocessor 200 goes to controller power save 416.

If electronic controller 150 receives a command from remote controller 106 it performs scan fret 1 sensor array 426. In more detail, scan fret 1 sensor array 426 monitors Fret 1 String 1 sensor 300, Fret 1 String 2 sensor 302, Fret 1 String 3 sensor 304, Fret 1 String 4 sensor 306, Fret 1 String 5 sensor 308, and Fret 1 String 6 sensor 310 through sensor array connector 384 on sensor assembly 100 and sets a flag for each sensor activated.

The next operation electronic controller 150 is scan fret 2 sensor array 428. In more detail, scan fret 2 sensor array 428 monitors Fret 2 String 1 sensor 312, Fret 2 String 2 sensor 314, Fret 2 String 3 sensor 316, Fret 2 String 4 sensor 318, Fret 2 String 5 sensor 320, and Fret 2 String 6 sensor 322 through sensor array connector 384 on sensor assembly 100 and sets a flag for each sensor activated.

Continuing the process electronic controller 150 performs scan fret 3 sensor array 430. In more detail, scan fret 3 sensor array 430 monitors fret 3 String 1 sensor 324, fret 3 String 2 sensor 326, fret 3 String 3 sensor 328, fret 3 String 4 sensor 330, fret 3 String 5 sensor 332, and fret 3 String 6 sensor 334 through sensor array connector 384 on sensor assembly 100 and sets a flag for each sensor activated.

Next in operation electronic controller 150 performs scan fret 4 sensor array 432. In more detail, scan fret 4 sensor array 432 monitors fret 4 String 1 sensor 336, fret 4 String 2 sensor 338, fret 4 String 3 sensor 340, fret 4 String 4 sensor 342, fret 4 String 5 sensor 344, and fret 4 String 6 sensor 346 through sensor array connector 384 on sensor assembly 100 and sets a flag for each sensor activated.

Next electronic controller 150 performs scan fret 5 sensor array 434. In more detail, scan fret 5 sensor array 436 monitors fret 5 String 1 sensor 348, fret 5 String 2 sensor 350, fret 5 String 3 sensor 352, fret 5 String 4 sensor 354, fret 5 String 5 sensor 356, and fret 5 String 6 sensor 358 through sensor array connector 384 on sensor assembly 100 and sets a flag for each sensor activated.

Subsequently electronic controller 150 performs scan fret 6 sensor array 436. In more detail, scan fret 6 sensor array 436 monitors fret 6 String 1 sensor 360, fret 6 String 2 sensor 362, fret 6 String 3 sensor 364, fret 6 String 4 sensor 366, fret 6 String 5 sensor 368, and fret 6 String 6 sensor 370 through sensor array connector 384 on sensor assembly 100 and sets a flag for each sensor activated.

Successively electronic controller 150 performs scan fret 7 sensor array 438. In more detail, scan fret 7 sensor array 438 monitors fret 7 String 1 sensor 372, fret 7 String 2 sensor 374, fret 7 String 3 sensor 376, fret 7 String 4 sensor 378, fret 7 String 5 sensor 380, and fret 7 String 6 sensor 382 through sensor array connector 384 on sensor assembly 100 and sets a flag for each sensor activated.

Upon completing the scan of plurality of fret sensors array 110 microprocessor 200 performs comm packet setup 440 to prepare a data transmission to remote controller 106. Subsequently microprocessor 200 executes load comm packet 442 to add the flags representing which fret string sensors 300, 302, 304, 306, 308, 310, 312, 314, 316, 318, 320, 322, 324, 326, 328, 330, 332, 334, 336, 338, 340, 342, 344, 346, 348, 350, 352, 354, 356, 358, 360, 362, 364, 366, 368, 370, 372, 374, 376, 378, 380, and 382 to the comm packet. Then microprocessor 200 enters send comm packet 444 to send the comm packet via antenna 218 to remote controller 106. Once sent, microprocessor 200 waits for a confirmation remote controller 106 received the comm packet. If the confirmation is not received in packet confirm 446, microprocessor 200 reverts to send comm packet 444. If packet confirm 446 receives a confirmation that remote controller 106 received the comm packet, electronic controller 150 initiates continue query 448 to remote controller 106 to determine if operation is to be continued. Microprocessor 200 then waits in receive continue 450 for a predetermined period. If receive continue 450 does not receive a command to continue operation of the current program electronic controller 150 reverts to remote command 424 state and waits for a command from remote controller 106 for a predetermined time. If electronic controller 150 receives a continue command from remote controller 106 to continue monitoring plurality of fret sensor arrays 110 electronic controller 150 returns to scan fret 1 sensor array 426.

If electronic controller 150 does not receive a continue command from remote controller 106 to continue monitoring plurality of fret sensor arrays 110 electronic controller 150 returns to remote command 424 to determine if further program functions will be received. If electronic controller 150 receives a command to continue monitoring performance electronic controller 150 performs scan fret 1 sensor array 426. If remote command 424 does not identify a command to continue, electronic controller goes to controller power save 416.

Figure 7:
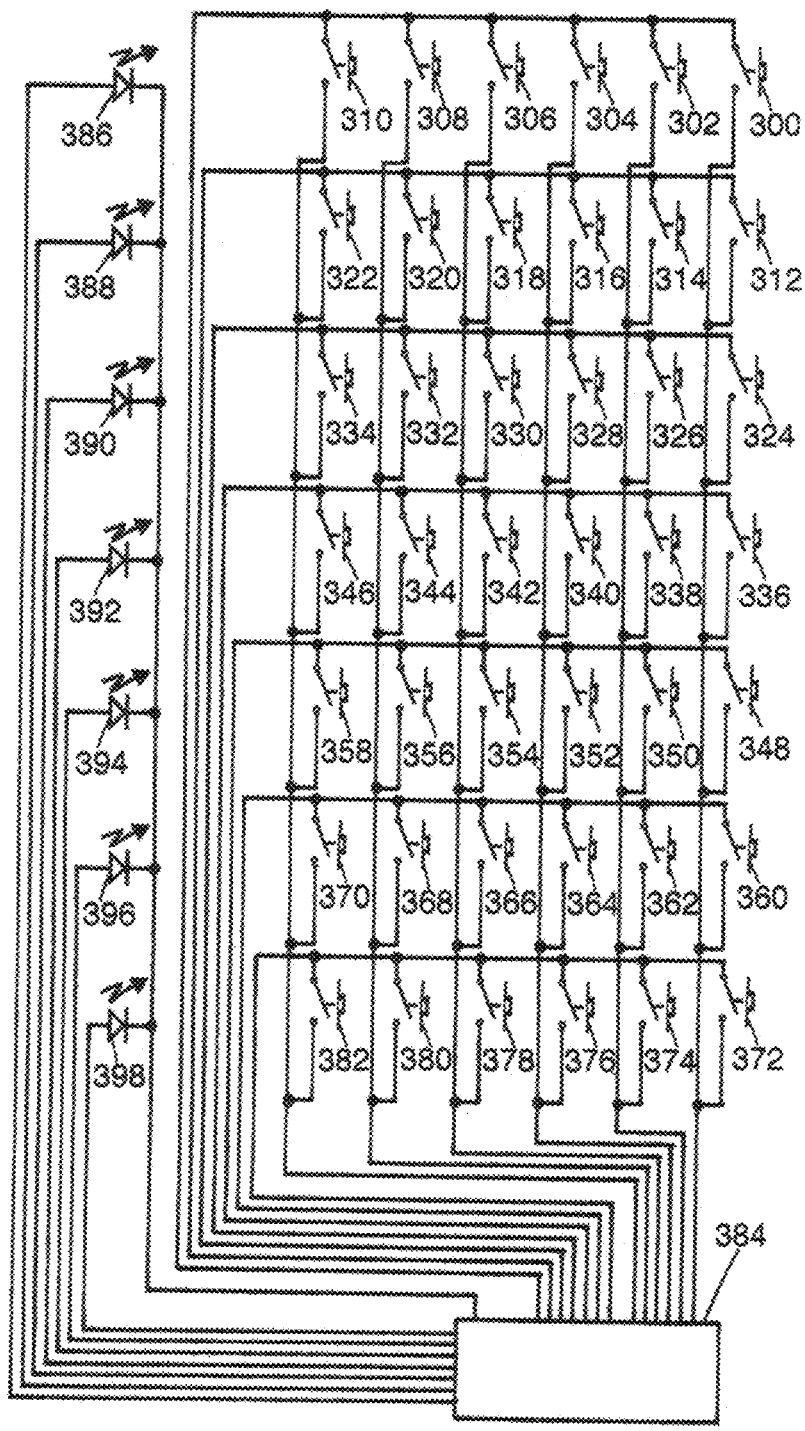
FIG. 7 depicts the schematic for a plurality of fret sensor arrays 110.

In FIG. 7 showing a plurality of fret sensor arrays 110, the following parts are defined. Fret 1 String 1 sensor 300 senses finger presses at location fret 1 string 1 and provides the signal to electronic controller 150 through sensor array connector 384. Fret 1 String 2 sensor 302 senses finger presses at location fret 1 string 2 and provides the signal to electronic controller 150 through sensor array connector 384. Fret 1 String 3 sensor 304 senses finger presses at location fret 1 string 3 and provides the signal to electronic controller 150 through sensor array connector 384. Fret 1 String 4 sensor 306 senses finger presses at location fret 1 string 4 and provides the signal to electronic controller 150 through sensor array connector 384. Fret 1 String 5 sensor 308 senses finger presses at location fret 1 string 5 and provides the signal to electronic controller 150 through sensor array connector 384. Fret 1 String 6 sensor 310 senses finger presses at location fret 1 string 6 and provides the signal to electronic controller 150 through sensor array connector 384.

For the second Fret location in FIG. 7, Fret 2 String 1 sensor 312 senses finger presses at location fret 2 string 1 and provides the signal to electronic controller 150 through sensor array connector 384. Fret 2 String 2 sensor 314 senses finger presses at location Fret 2 string 2 and provides the signal to electronic controller 150 through sensor array connector 384. Fret 2 String 3 sensor 316 senses finger presses at location Fret 2 string 3 and provides the signal to electronic controller 150 through sensor array connector 384. Fret 2 String 4 sensor 318 senses finger presses at location Fret 2 string 4 and provides the signal to electronic controller 150 through sensor array connector 384. Fret 2 String 5 sensor 320 senses finger presses at location Fret 2 string 5 and provides the signal to electronic controller 150 through sensor array connector 384. Fret 2 String 6 sensor 322 senses finger presses at location Fret 2 string 6 and provides the signal to electronic controller 150 through sensor array connector 384.

For the third Fret location in FIG. 7, Fret 3 String 1 sensor 324 senses finger presses at location Fret 3 string 1 and provides the signal to electronic controller 150 through sensor array connector 384. Fret 3 String 2 sensor 326 senses finger presses at location Fret 3 string 2 and provides the signal to electronic controller 150 through sensor array connector 384. Fret 3 String 3 sensor 328 senses finger presses at location Fret 3 string 3 and provides the signal to electronic controller 150 through sensor array connector 384. Fret 3 String 4 sensor 330 senses finger presses at location Fret 3 string 4 and provides the signal to electronic controller 150 through sensor array connector 384. Fret 3 String 5 sensor 332 senses finger presses at location Fret 3 string 5 and provides the signal to electronic controller 150 through sensor array connector 384. Fret 3 String 6 sensor 334 senses finger presses at location Fret 3 string 6 and provides the signal to electronic controller 150 through sensor array connector 384.

For the fourth Fret location in FIG. 7, Fret 4 String 1 sensor 336 senses finger presses at location Fret 4 string 1 and provides the signal to electronic controller 150 through sensor array connector 384. Fret 4 String 2 sensor 338 senses finger presses at location Fret 4 string 2 and provides the signal to electronic controller 150 through sensor array connector 384. Fret 4 String 3 sensor 340 senses finger presses at location Fret 4 string 3 and provides the signal to electronic controller 150 through sensor array connector 384. Fret 4 String 4 sensor 342 senses finger presses at location Fret 4 string 4 and provides the signal to electronic controller 150 through sensor array connector 384. Fret 4 String 5 sensor 344 senses finger presses at location Fret 4 string 5 and provides the signal to electronic controller 150 through sensor array connector 384. Fret 4 String 6 sensor 346 senses finger presses at location Fret 4 string 6 and provides the signal to electronic controller 150 through sensor array connector 384.

For the fifth Fret location in FIG. 7, Fret 5 String 1 sensor 348 senses finger presses at location Fret 5 string 1 and provides the signal to electronic controller 150 through sensor array connector 384. Fret 5 String 2 sensor 350 senses finger presses at location Fret 5 string 2 and provides the signal to electronic controller 150 through sensor array connector 384. Fret 5 String 3 sensor 352 senses finger presses at location Fret 5 string 3 and provides the signal to electronic controller 150 through sensor array connector 384. Fret 5 String 4 sensor 354 senses finger presses at location Fret 5 string 4 and provides the signal to electronic controller 150 through sensor array connector 384. Fret 5 String 5 sensor 356 senses finger presses at location Fret 5 string 5 and provides the signal to electronic controller 150 through sensor array connector 384. Fret 5 String 6 sensor 358 senses finger presses at location Fret 5 string 6 and provides the signal to electronic controller 150 through sensor array connector 384.

For the sixth Fret location in FIG. 7, Fret 6 String 1 sensor 360 senses finger presses at location Fret 6 string 1 and provides the signal to electronic controller 150 through sensor array connector 384. Fret 6 String 2 sensor 362 senses finger presses at location Fret 6 string 2 and provides the signal to electronic controller 150 through sensor array connector 384. Fret 6 String 3 sensor 364 senses finger presses at location Fret 6 string 3 and provides the signal to electronic controller 150 through sensor array connector 384. Fret 6 String 4 sensor 366 senses finger presses at location Fret 6 string 4 and provides the signal to electronic controller 150 through sensor array connector 384. Fret 6 String 5 sensor 368 senses finger presses at location Fret 6 string 5 and provides the signal to electronic controller 150 through sensor array connector 384. Fret 6 String 6 sensor 370 senses finger presses at location Fret 6 string 6 and provides the signal to electronic controller 150 through sensor array connector 384.

For the seventh Fret location in FIG. 7, Fret 7 String 1 sensor 372 senses finger presses at location Fret 7 string 1 and provides the signal to electronic controller 150 through sensor array connector 384. Fret 7 String 2 sensor 374 senses finger presses at location Fret 7 string 2 and provides the signal to electronic controller 150 through sensor array connector 384. Fret 7 String 3 sensor 376 senses finger presses at location Fret 7 string 3 and provides the signal to electronic controller 150 through sensor array connector 384. Fret 7 String 4 sensor 378 senses finger presses at location Fret 7 string 4 and provides the signal to electronic controller 150 through sensor array connector 384. Fret 7 String 5 sensor 380 senses finger presses at location Fret 7 string 5 and provides the signal to electronic controller 150 through sensor array connector 384. Fret 7 String 6 sensor 382 senses finger presses at location Fret 7 string 6 and provides the signal to electronic controller 150 through sensor array connector 384.

Also on FIG. 7, Fret 1 LED 386, Fret 2 LED 388, Fret 3 LED 390, Fret 4 LED 392, Fret 5 LED 394, Fret 6 LED 396, and Fret 7 LED 398 can be used independently or in conjunction with each other to indicate target locations to press strings and/or provide feedback to the user on performance of the commanded finger placements. Fret 1 LED 386, Fret 2 LED 388, Fret 3 LED 390, Fret 4 LED 392, Fret 5 LED 394, Fret 6 LED 396, and Fret 7 LED 398 are representative of a typical embodiment of the invention. Other embodiments of the device increase the number of LEDs for additional user feedback.

Figure 10:
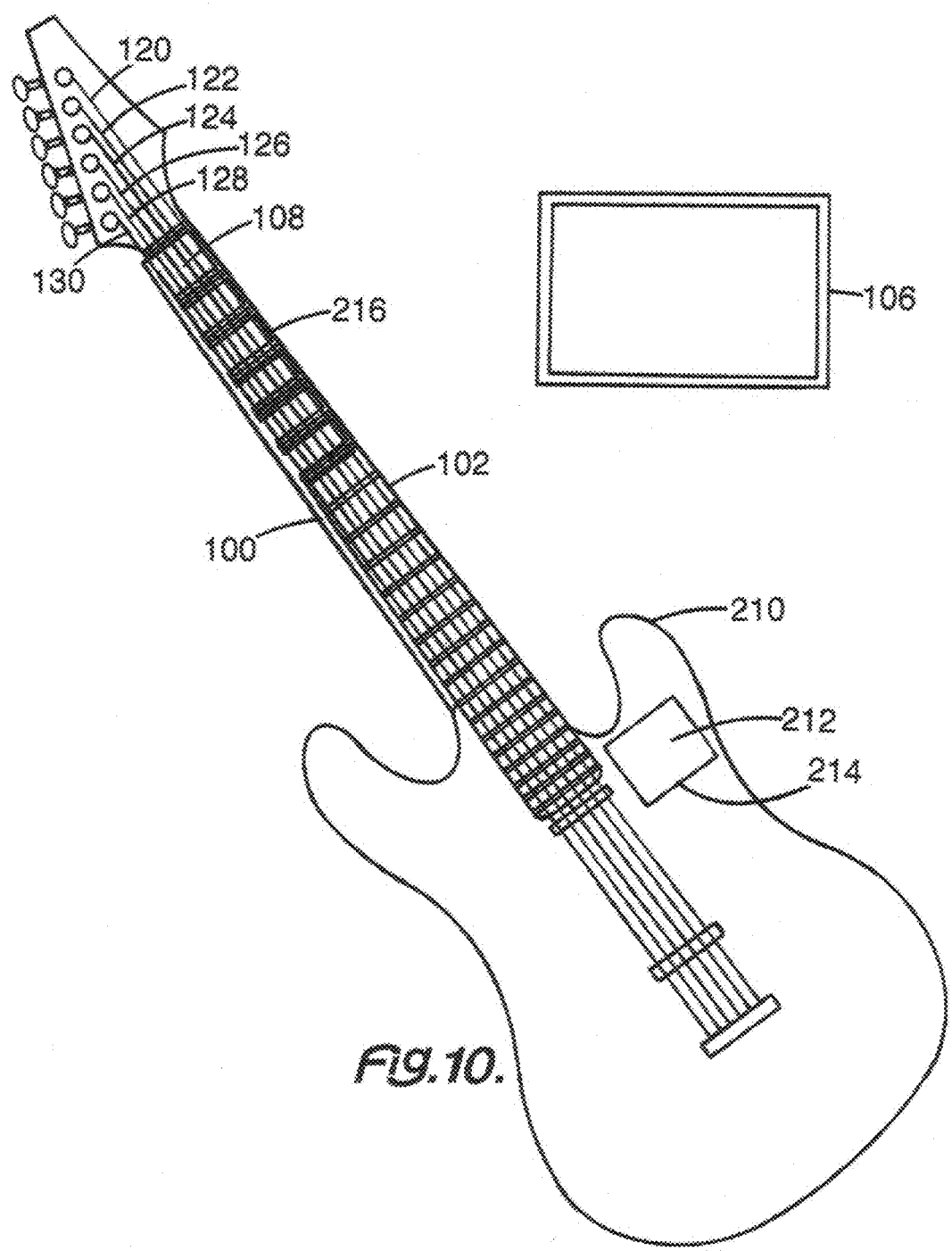
FIG. 10 depicts a top plan view of the sensor assembly 100 and the auxiliary electronics enclosure 212 as attached to a standard stringed instrument 210 or guitar and the remote device 106.
Figure 11:
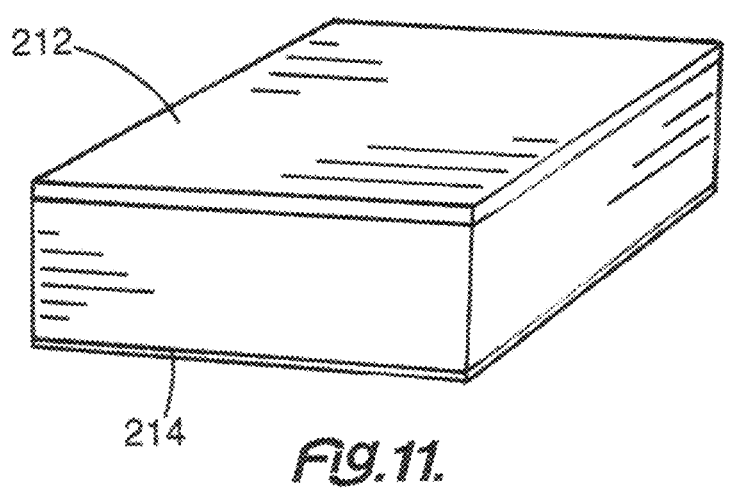
FIG. 11 depicts a perspective view of an auxiliary electronic enclosure 212 for the electronic controller 150 of FIG. 4, FIG. 5, and FIG. 6.

One alternate embodiment is to have the sensor assembly 100 and electronic controller 150 attached to a standard stringed instrument 210 in FIG. 10 such as a guitar. The alternate embodiment of FIG. 10 has a removable adhesive 216 to attach the singular 108 or plurality of fret sensor arrays 110 to the neck of the standard stringed instrument 210. The electronic controller 150 is housed in a auxiliary electronics enclosure 212 shown in FIG. 10 and FIG. 11 and provides removable adhesive 214 or other method for attachment to the standard stringed instrument 210. In this embodiment, the remote device 106 and user application provide the same functionality as the preferred embodiment of the invention.

Figure 12:
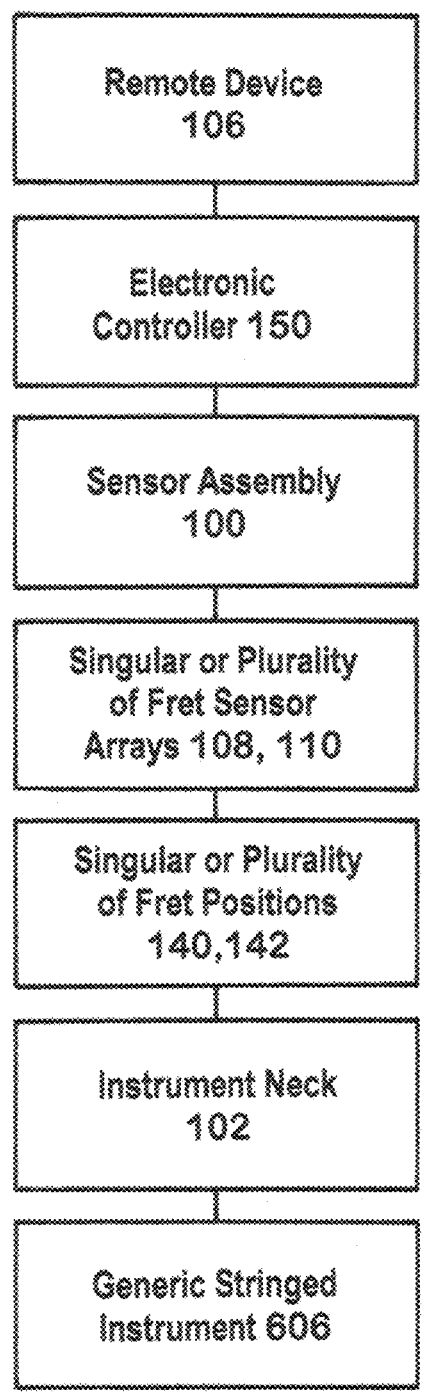
FIG. 12 illustrates a general embodiment of the design concept of the invention for a stringed instrument 210.

FIG. 12 depicts the concept of the invention as applied to a generic stringed instrument 606. As relates to this invention generic stringed instrument 606 may be a standard stringed instrument as used by typical musicians or it may be a partial model of a standard stringed instrument to facilitate use of the invention in a portable manner. In this model remote device 106 executes an executable program directed by the user to communicate to an electronic controller 150 as part of a sensor assembly 100 located on a generic stringed instrument 606. Sensor assembly 100 is further comprised of a singular 108 or plurality of fret sensor arrays 110 that monitor the user's placement of fingers on a singular 140 or plurality of fret positions 142 on the instrument neck 102 through a series of sensors or switches. The plurality of fret positions 142 are part of a generic stringed instrument 606 that requires users to place fingers in a variety of specific positions and combinations in conjunction with stimulus such as vibrating strings to produce sound. In this embodiment, remote device 106 monitors the user performance of specified notes, sets of notes, or songs played on command by the user and provides the user with performance feedback through a variety of audio and visual methods.

Figure 13:
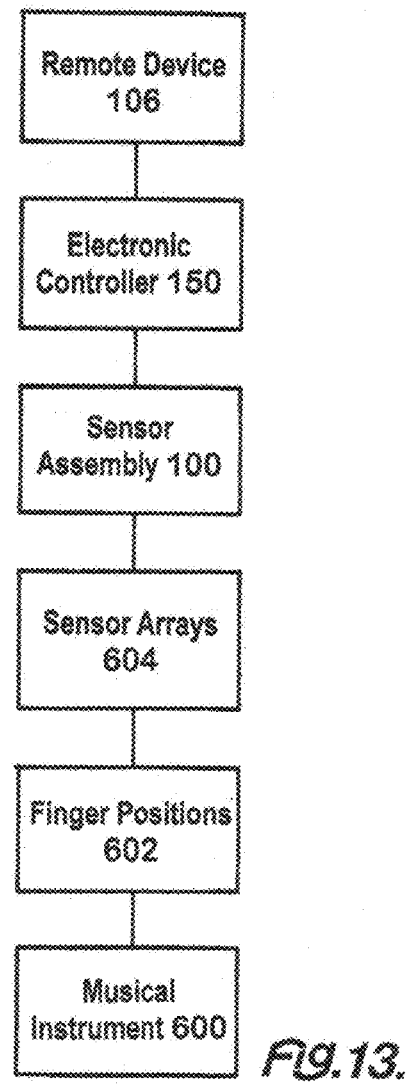
FIG. 13 illustrates a general embodiment of the design concept of the invention as applied to a generic instrument.

In a broad embodiment of the invention, FIG. 13 depicts the concept of the invention as applied to a generic musical instrument 600. As relates to this invention musical instrument 600 may be a standard instrument as used by typical musicians or it may be a partial model of a standard instrument to facilitate use of the invention in a portable manner. In this model remote device 106 executes an executable program directed by the user to communicate to an electronic controller 150 as part of a sensor assembly 100 located on a musical instrument 600. Sensor assembly 100 is further comprised of a singular or plurality of sensor arrays that monitor the user's placement of fingers on finger positions 602 through a series of sensors or switches on sensor arrays 604. Finger positions 602 are part of a general musical instrument 600 that requires users to place fingers in a variety of specific positions and combinations in conjunction with stimulus such as vibrating strings or moving air to produce sound on a standard instrument. In this general embodiment, remote device 106 monitors the user performance of specified notes, sets of notes, or songs played on command by the user and provides the user with performance feedback through a variety of audio and visual methods.

The advantages of the present invention include, without limitation, the ability of the invention to provide training in a portable and mobile fashion. The invention provides the user the ability to select the training program that has standard musical notes including but not limited to C, D, E, F, G, A, B or sequences of musical notes and a portion of or the entirety of songs. The remote device 106 allows the user to choose visual or audio feedback by means of a variety of methods that include real time feedback and recordings of a performance by a student or user as compared to the training program selected. For the audio feedback, the user can choose to isolate the audible sound to headphones or broadcast it on another conventional speaker.

In broad embodiment, the present invention is a mobile device that allows the user to train finger placement for musical notes on a stringed instrument 210. The invention provides the user with multiple methods for feedback on their performance of a user selected training exercise at a user selected difficulty level that can be recorded for evaluation immediately or at a later time. In one mode of operation, the invention provides the ability of the user to record the notes played to create a music score for future use.

In FIG. 10, the function of portable training device 112 for a stringed instrument 210 becomes clear. Stringed instrument 210 has an instrument neck 102 to receive the sensor assembly 100. The sensor assembly 100 has an attached enclosure 104 (FIG. 1) or auxiliary electronic enclosure 212 (FIG. 10 or FIG. 11) with an electronic controller 150 therein for a singular 108 or plurality of fret sensor arrays 110. Information on finger placement monitored by the singular 108 or plurality of fret sensor arrays 110 can go to the remote device 106 to be evaluated and presented to the instrument user.

Such feedback permits the user to adjust finger placement and use appropriately and efficiently with audible or visual indications. Such results develop a music ear, and assist with the playing and tuning of stringed instrument 210, especially a guitar.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. A music instrument training or teaching device for a stringed instrument comprising:
   a sensor array, a remote device and an electronic controller cooperating to form the music instrument training or teaching device;
   the sensor array assisting in finger placement on a set of strings for the stringed instrument and feedback on proper finger use and placement;
   the sensor array providing feedback on proper finger use and placement in finger placement on the set of strings by an instrument user;
   the sensor array being mountable on an instrument neck of a stringed instrument;
   the sensor array being adapted to communicate with the remote device and the electronic controller to assist in a finger placement on the set of strings;
   the remote device or the electronic controller providing a video feedback or an audio feedback on the set of strings;
   the sensor array transposing the video feedback or the audio feedback into a music score on the remote device;
   the sensor array including an electronics enclosure;
   the sensor array being mounted on an instrument neck of the stringed instrument;
   the sensor array having a singular fret sensor array or a plurality of fret sensor arrays;
   the sensor array attaching to the instrument neck;
   the instrument having a set of strings thereover;
   the sensor array being positioned between the set of strings and the neck;
   the set of strings applying at a singular fret position or a plurality of fret positions;
   the instrument neck attaching to the electronics enclosure;
   the electronics enclosure containing the electronic controller;
   the electronics enclosure serving as a balance or a body rest for the remote device;
   the remote device executing an application from the instrument user to direct, monitor, track, or record at least one member of a set of finger actions of the instrument user on the set of strings;
   the remote device prompting the instrument user with either a visual cue or an audio cue of a note, a series of notes, sets of notes, or songs for which the instrument user is to perform the corresponding finger placements;
   the electronic controller monitoring a set of sensors on the sensor array;
   the set of sensors including a string sensor for each member string in the set of strings;
   the remote device recording, tracking, or analyzing the singular fret sensor array or the plurality of fret sensor arrays at least one activation with respect to a prompted note, a set of prompted notes, set of notes, or at least on song prompted; and
   the remote device being adapted to present live information or recorded information to the instrument user so that the information can be reviewed, saved, or otherwise evaluated by the instrument user or another person; sending a command to a wireless controller on electronic controller to connect with the remote device; having the remote device initiate a connection to a microprocessor on the electronic controller; providing power to the electronic controller with at least one battery; scanning for a remote connection request from the remote device; establishing a link between the electronic controller and the remote device; prompting the user for operation settings, the operation settings including a training program to be executed, a difficulty level for the training program, a user feedback rate, and a user feedback method; and training for a series of musical notes including to C, D, E, F, G, A, or B.

2. The music instrument training or teaching device of claim 1 further comprising:
   a) the instrument user selecting at least one operation settings for the music instrument training or teaching device;
   b) the remote device prompting the instrument user to play a musical note or notes in a selected training program;
   c) the electronic controller monitoring the singular fret sensor array or the plurality of fret sensor arrays in order to sense when and where each member of the set of strings has been pressed by the instrument user;
   d) the remote device receiving information on each note played from the electronic controller;
   e) the sensor array being removably mountable on the instrument neck of a stringed instrument; and
   f) the remote device monitoring, comparing and tracking each string in the set of strings as fret location and timing of presses.

3. The music instrument training or teaching device of claim 2 further comprising:
   a) the instrument user selecting a training program;
   b) a timing of at least one string press being a function of the training program;
   c) the training program being executed by the remote device; and
   d) the remote device then providing user feedback in a manner selected in at a beginning of the training program.

4. The music instrument training or teaching device of claim 3 further comprising:
   a) the sensor array being attachable to an instrument with adhesive;
   b) the electronic controller being housed in a separate enclosure; and
   c) the separate enclosure being attachable to the instrument with adhesive.

5. A method of training or teaching a person how to play a stringed instrument comprising:
   providing a sensor array, a remote device and an electronic controller cooperating to form a music instrument training or teaching device;
   supporting the sensor array assisting in finger placement on a set of strings for the stringed instrument;
   providing feedback on proper finger use and placement on the set of strings;
   mounting the sensor array on an instrument neck of a stringed instrument;
   adapting the sensor array to communicate with the remote device and the electronic controller to assist in a finger placement on the set of strings;
   providing a video feedback or an audio feedback on the set of strings from the remote device or the electronic controller;
   transposing the video feedback or the audio feedback of the sensor array into a music score on the remote device;
   providing an electronics enclosure for the sensor array;
   mounting the sensor array on an instrument neck of the stringed instrument;
   providing the sensor array with a singular fret sensor array or a plurality of fret sensor arrays;
   attaching the sensor array to the instrument neck;
   the instrument having a set of strings thereover;
   the sensor array being positioned between the set of strings and the neck;
   applying the set of strings at a singular fret position or a plurality of fret positions;
   attaching the electronics enclosure to the instrument neck;
   providing the electronics enclosure as a container for the electronic controller;
   providing the electronics enclosure as a balance or a body rest for the remote device;
   using the remote device to execute an application from a instrument user to direct, monitor, track, or record at least one member of a set of finger actions of the instrument user on the set of strings;
   using the remote device to prompt the instrument user with either a visual cue or an audio cue of a note, a series of notes, sets of notes, or songs for which the instrument user is to perform the corresponding finger placements;
   monitoring a set of sensors on the sensor array with the electronic controller;
   including a string sensor in the set of sensors for each member string in the set of strings;
   using the remote device to record, track or analyze the singular fret sensor array or the plurality of fret sensor arrays at least one activation with respect to a prompted note, a set of promoted notes, set of notes, or at least on song prompted;
   adapting the remote device to present live information or recorded information for a review of the instrument as played;
   having the instrument user select at least one set of operation settings for the remote device;
   using the remote device to prompt the instrument user to play a musical note or notes in a selected training program;
   monitoring the electronic controller to control the singular fret sensor array or the plurality of fret sensor arrays in order to sense when and where each member of the set of strings has been pressed by the instrument user;
   providing the remote device with information on each note played from the electronic controller;
   using the remote device to monitor, to compare or to track each string in the set of strings as fret location and timing of presses;
   having the instrument user select a training program;
   timing at least one string press as a function of the training program;
   executing the training program with the remote device;
   having the remote device then provide user feedback in a manner selected in at a beginning of the training program;
   adhesively attaching the sensor array to the stringed instrument;

housing the electronic controller in a separate enclosure;
attaching the separate enclosure to the stringed instrument with adhesive;
initiating the at least one operation setting with the remote device;
sending a command to a wireless controller on electronic controller to connect with the remote device;
having the remote device initiate a connection to a microprocessor on the electronic controller;
providing power to the electronic controller with at least one battery;
scanning for a remote connection request from the remote device;
establishing a link between the electronic controller and the remote device;
prompting the user for operation settings, the operation settings including a training program to be executed, a difficulty level for the training program, a user feedback rate, and a user feedback method; and
training for a series of musical notes including to C, D, E, F, G, A, or B.

6. The method of claim 5 further comprising:
a) sending a command to a note or sets of notes in varying sequences, or songs;
b) using an interval between notes, user defined notes, or a sequence of notes;
c) providing feedback in the form of immediate feedback for each note, feedback for each group of notes, feedback for each training program, visual feedback, audible feedback or combinations thereof;
d) selecting the operation setting or settings;
e) prompting the user to play at least one note with the remote device; and
f) monitoring a singularity of fret sensor arrays or the plurality of fret sensor arrays.

7. A method of training or teaching a person how to play a stringed instrument comprising:
providing a sensor array, a remote device and an electronic controller cooperating to form a music instrument training or teaching device;
supporting the sensor array assisting in finger placement on a set of strings for the stringed instrument;
providing feedback on proper finger use and placement on the set of strings;
mounting the sensor array on an instrument neck of a stringed instrument;
adapting the sensor array to communicate with the remote device and the electronic controller to assist in a finger placement on the set of strings;
providing a video feedback or an audio feedback on the set of strings from the remote device or the electronic controller;
transposing the video feedback or the audio feedback of the sensor array into a music score on the remote device;
providing an electronics enclosure for the sensor array;
mounting the sensor array on an instrument neck of the stringed instrument;
providing the sensor array with a singular fret sensor array or a plurality of fret sensor arrays;
attaching the sensor array to the instrument neck;
the instrument having a set of strings thereover;
the sensor array being positioned between the set of strings and the neck;
applying the set of strings at a singular fret position or a plurality of fret positions;
attaching the electronics enclosure to the instrument neck;
providing the electronics enclosure as a container for the electronic controller;
providing the electronics enclosure as a balance or a body rest for the remote device;
using the remote device to execute an application from a instrument user to direct, monitor, track, or record at least one member of a set of finger actions of the instrument user on the set of strings;
using the remote device to prompt the instrument user with either a visual cue or an audio cue of a note, a series of notes, sets of notes, or songs for which the instrument user is to perform the corresponding finger placements;
monitoring a set of sensors on the sensor array with the electronic controller;
including a string sensor in the set of sensors for each member string in the set of strings;
using the remote device to record, track or analyze the singular fret sensor array or the plurality of fret sensor arrays at least one activation with respect to a prompted note, a set of prompted notes, set of notes, or at least on song prompted;
adapting the remote device to present live information or recorded information for a review of the instrument as played;
having the instrument user select at least one set of operation settings for the remote device;
using the remote device to prompt the instrument user to play a musical note or notes in a selected training program;
monitoring the electronic controller to control the singular fret sensor array or the plurality of fret sensor arrays in order to sense when and where each member of the set of strings has been pressed by the instrument user;
providing the remote device with information on each note played from the electronic controller;
using the remote device to monitor, to compare or to track each string in the set of strings as fret location and timing of presses;
having the instrument user select a training program;
timing at least one string press as a function of the training program;
executing the training program with the remote device;
having the remote device then provide user feedback in a manner selected in at a beginning of the training program;
attaching the sensor array to the stringed instrument;
housing the electronic controller in a separate enclosure;
attaching the separate enclosure to the stringed instrument;
initiating the at least one operation setting with the remote device;
sending a command to a wireless controller on electronic controller to connect with the remote device;
having the remote device initiate a connection to a microprocessor on the electronic controller;
providing power to the electronic controller with at least one battery;
scanning for a remote connection request from the remote device;
establishing a link between the electronic controller and the remote device;
prompting the user for operation settings, the operation settings including a training program to be executed, a difficulty level for the training program, a user feedback rate, and a user feedback method; and training for a series of musical notes including C, D, E, F, G, A, or B.

8. The method of claim 7 further comprising:

sending a command to a note or sets of notes in varying sequences, or songs;
  using an interval between notes, user defined notes, or a sequence of notes;
  providing feedback in the form of immediate feedback for each note, feedback for each group of notes, feedback for each training program, visual feedback, audible feedback or combinations thereof;
  selecting the operation setting or settings;
  prompting the user to play at least one note with the remote device; and
  monitoring a singularity of fret sensor arrays or the plurality of fret sensor arrays.

9. The method of claim 8 further comprising:

adhesively attaching the sensor array to the stringed instrument; and attaching the separate enclosure to the stringed instrument with adhesive.

\* \* \* \* \*